United States Patent [19]

Staschke

[11] 3,996,746
[45] Dec. 14, 1976

[54] THERMAL MOTOR WITH MECHANISM FOR CONVERTING PISTON STROKE TO LONGER STROKE

[75] Inventor: Marvin A. Staschke, Glendora, Calif.

[73] Assignee: Thermal Hydraulics Corporation, Glendora, Calif.

[22] Filed: June 9, 1975

[21] Appl. No.: 584,923

[52] U.S. Cl. .................................. 60/528; 200/47
[51] Int. Cl.² .......................................... F03G 7/06
[58] Field of Search ............ 60/527, 528; 337/125, 337/386, 114; 236/99, 100; 92/13, 13.7; 91/361; 200/47

[56] References Cited
UNITED STATES PATENTS

| | | | |
|---|---|---|---|
| 2,906,842 | 9/1959 | Brin | 200/47 X |
| 3,219,770 | 11/1965 | Chasar | 200/47 |
| 3,500,634 | 3/1970 | Waseleski, Jr. et al. | 60/528 |

*Primary Examiner*—Allen M. Ostrager
*Attorney, Agent, or Firm*—Bertha L. MacGregor

[57] ABSTRACT

A thermally actuated motor which has a short piston stroke is provided with mechanism for converting the stroke to a selected longer stroke without prolonging the motor actuation time. The said mechanism comrises a base, means pivotally mounting the motor on the base, a crank arm pivotally mounted at one end on the base and having a fitting on its opposite end for connection to the object to be actuated by the motor; said crank arm being pivotally connected between its ends to the motor piston shaft. A limit switch is adjustably mounted on the base for contact by the crank arm. Coiled springs connected to the base and crank arm return the crank arm to normal position after it has been actuated by the motor shaft. In a thermal motor having an approximately 11/16 inch piston stroke, the mechanism converts the stroke to a selected longer stroke of approximately 3 inches.

6 Claims, 3 Drawing Figures

THERMAL MOTOR WITH MECHANISM FOR CONVERTING PISTON STROKE TO LONGER STROKE

BACKGROUND OF THE INVENTION

This invention relates to a thermal motor with mechanism for converting the motor piston stroke to a selected longer stroke. The thermally actuated motor may be of the type shown in U.S. Pat. No. 3,029,595 granted to John F. Sherwood, and other patents assigned to the assignee of this application, in which the expansion of wax is utilized as the means for actuating the motor shaft. Thermal motors of the kind disclosed in prior art patents have a relatively short piston stroke, such as approximately 11/16 inch.

SUMMARY OF THE INVENTION

The invention comprises a thermally actuated motor which has a relatively short piston shaft stroke, in combination with mechanism for lengthening the stroke without prolonging the motor actuation time. For example, the thermal motor may be the kind which employs the expansion of wax as the means for actuating its piston shaft. In conventional motors of this type, the stroke is relatively short for actuating valves, dampers, and other mechanisms. In order to lengthen the stroke without prolonging the piston shaft actuation time, this invention provides a base in the form of a flat plate, means pivotally mounting the thermal motor on the base, a crank arm pivotally mounted at one end on the base and having a fitting on its opposite end for connection to a device to be actuated by the longer stroke of the arm, said crank arm being pivotally connected between its ends to the motor shaft. A limit switch is adjustably mounted on the base for contact by the crank arm for controlling the length of the stroke. A coiled spring or springs, connected to the base and to the crank arm, serve to return the crank arm to rest position after it has been actuated by the motor shaft, and may seve also to generate a usable return force for actuating other mechanism.

OBJECTS OF THE INVENTION

The object of this invention is to provide mechanism actuated by the aforementioned thermal motor shaft whereby the short piston stroke is made longer without prolonging the time required for the shaft actuation by the thermal motor.

Another object is to provide means for controlling the degree of lengthening of the piston shaft stroke, for example, between the 11/16 inch shaft stroke and a 3 inch stroke produced by the mechanism of this invention.

Another object of the invention is to provide means for lengthening the thermal motor shaft stroke and preventing side thrust applied to the motor shaft whereby side wear on the motor bearing surfaces and seals may occur.

Another object is to provide means for returning the motor piston shaft to rest position after functioning of the parts producing a longer stroke, and also for generating a usable return force for actuating a damper or other mechanism.

DRAWINGS

DESCRIPTION OF THE PREFERRED EMBODIMENT

Figure 1:
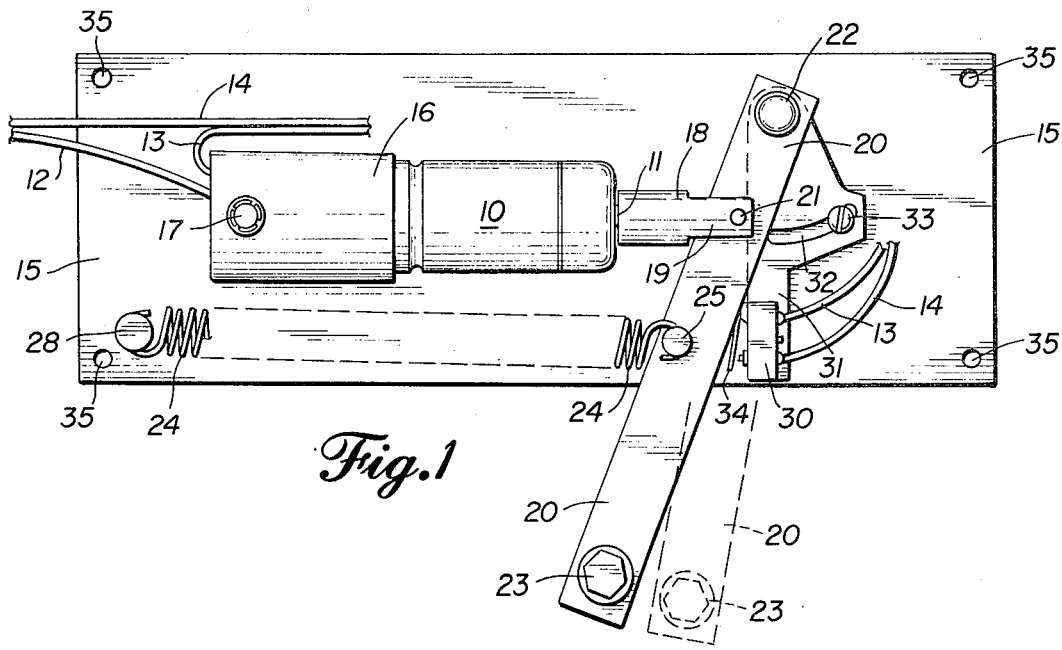
FIG. 1 is a top plan view of a thermal motor with mechanism for converting the motor shaft stroke to a selected longer stroke, mounted on a base, showing the motor shaft and crank arm in rest positions, and showing also a limit switch and its mounting plate in one of their selected positions.
Figure 2:
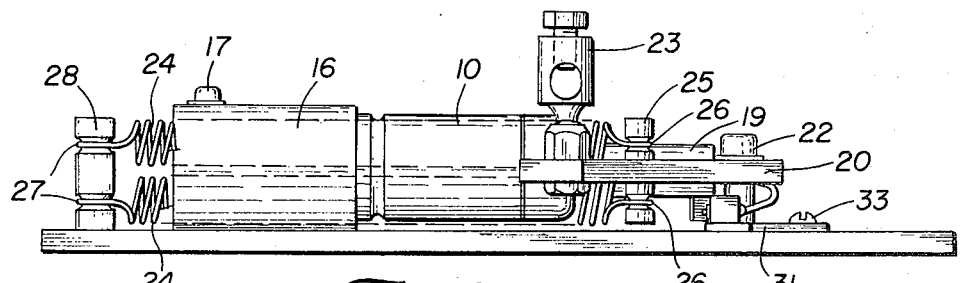
FIG. 2 is a side elevational view of the same.

The thermal motor comprises a housing 10 and piston shaft 11 actuated by thermally expansible material (not shown) in the housing, well known in the art. The shaft 11 is a relatively short stroke shaft. The expansible material is heated by an electrical thermal unit (not shown) connected to a current source by wiring 12, 13, 14 which also energizes a limit switch described hereinafter.

Mechanism for converting the piston stroke to a selected longer stroke without prolonging the time required for said longer stroke actuation comprises a flat rectangularly shaped base 15 of metal, large enough to support the thermal motor 10, the stroke converting mechanism and limit switch. The motor 10 is provided with a sleeve 16 which aids in pivotally connecting the motor to the base 15 by means of a pivot pin 17. The piston shaft 11 is partly covered with a sleeve-form member 18 extended beyond the shaft 11 to provide two extension members 19 spaced from each other to receive a crank arm 20 between them.

The arm 20 is pivotally connected between its ends to the shaft extension members 19 by a clevis pivot pin 21. The crank arm 20 is pivotally connected at one end to the base 15 by a crank arm pivot pin 22, and at its opposite end is provided with a fitting 23 suitable for connecting the crank arm 20 to mechanism (not shown) to be actuated by the piston shaft 11. The crank arm 20 has connected to it a pair of springs 24 which extend longitudinally of the base near one side of the thermal motor. The connection comprises a stud 25 which extends through the crank arm 20 and moves with it; the stud has grooves above and below the arm for receiving the ends 26 of the springs 23. The opposite ends 27 of the springs are similarly connected to a stud 28 fixed in the base 15.

The piston stroke of the thermal motor shown in the drawings is approximately 11/16 inch. The length of travel of the fitting 23 on the crank arm 20 is 3 inches.

Figure 3:
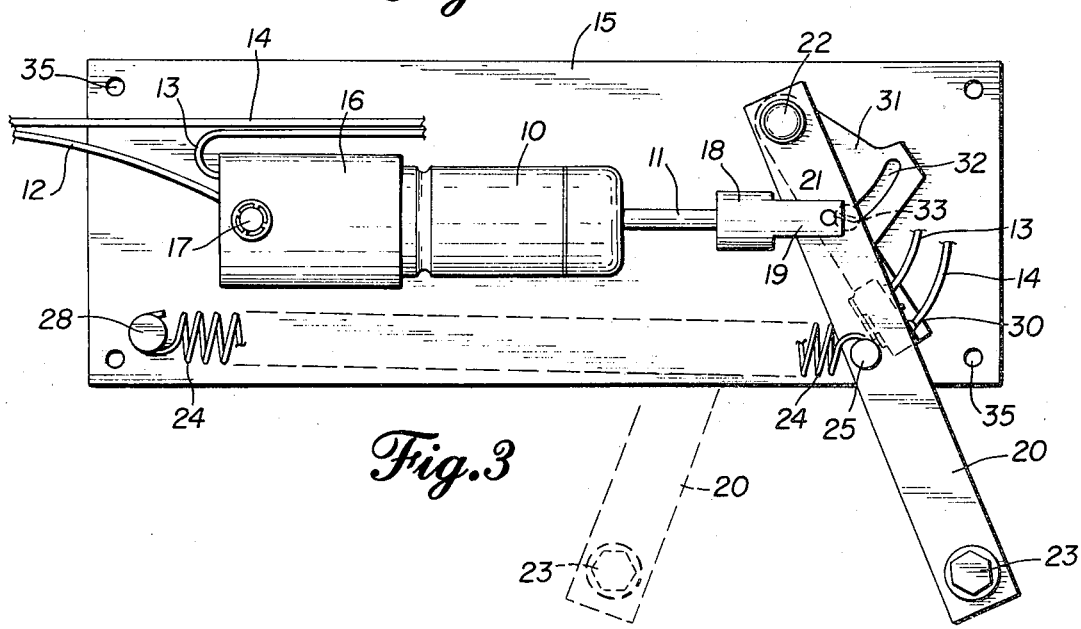
FIG. 3 is a top plan view similar to FIG. 1, showing the motor shaft extended, the crank arm in full lines in its longer stroke position, and the limit switch and its mounting plate adjusted for the longer stroke.

The length of the stroke of the shaft 11 and the length of travel of the arm 20 are controlled by a limit switch 30 mounted on a plate 31 movable on the base 15. The plate 31 has a curved slot 32 extending through the plate. A headed screw 33 extends through the slot into the base 15 to adjustably mount the plate 31 and limit switch 30 on the base 15 in positions where the crank arm 20 contacts the spring finger 34 of the limit switch when the crank arm reaches its selected position. In FIG. 1, the full lines show the non-operative position of the crank arm 20, and the broken lines show a different but short stroke position of the arm. FIG. 3 shows the selected long stroke position of the crank arm 20, while the broken lines shown the non-operative crank arm position.

The base 15 is provided with holes 35 near its four corners for receiving screws (not shown) for mounting the base wherever the motor and stroke converting mechanism may be used.

It is to be understood that the thermal motor and its piston shaft may vary in size and length of shaft stroke, and that the stroke converting mechanism may produce a stroke of a length other than that described herein.

I claim:

1. A thermal motor having a relatively short piston shaft stroke in combination with mechanism for converting the stroke to a longer stroke without prolonging the required motor actuation time, comprising
    a. a thermal motor having a housing and an axially movable piston shaft,
    b. a base plate on which the motor housing is pivotally mounted,
    c. a crank arm pivotally mounted at one end on the base and pivotally connected between its ends to the motor shaft, said arm having a fitting on its opposite end for connection to an object to be actuated by the arm,
    d. a limit switch and mounting plate mounted on the base in position providing contact between the crank arm and limit switch and deactivating the motor, the position of the switch relatively to the crank arm being adjustable, and
    e. means returning the crank arm to rest position.

2. The invention defined by claim 1, in which the motor shaft has a free end outside of the motor housing, and includes a sleeve surrounding and fastened to said free end, and spaced apart extension members on the sleeve receiving the crank arm between them and fastening the arm to the motor shaft.

3. The invention defined by claim 1, in which the means for returning the crank arm to rest position comprises a pair of coiled springs, a stud extending through the crank arm and movable with the arm, and a stud fixedly mounted on the base, said springs being attached at one of their ends to said movable stud and attached at the opposite ends to said fixed stud.

4. The invention defined by claim 1, in which the limit switch mounting plate is provided with a curved slot and the plate is adjustably mounted on the base by a headed screw extending through the slot in the plate and into the base.

5. The invention defined by claim 1, in which the limit switch includes a spring finger positioned to be contacted by the crank arm at a predetermined position in its travel.

6. The invention defined by claim 1, in which the motor is pivotally mounted on the base plate by a pivot pin perpendicular to the base plate for preventing side thrust on motor parts when the converting mechanism is operative.

* * * * *